Patented Nov. 21, 1933

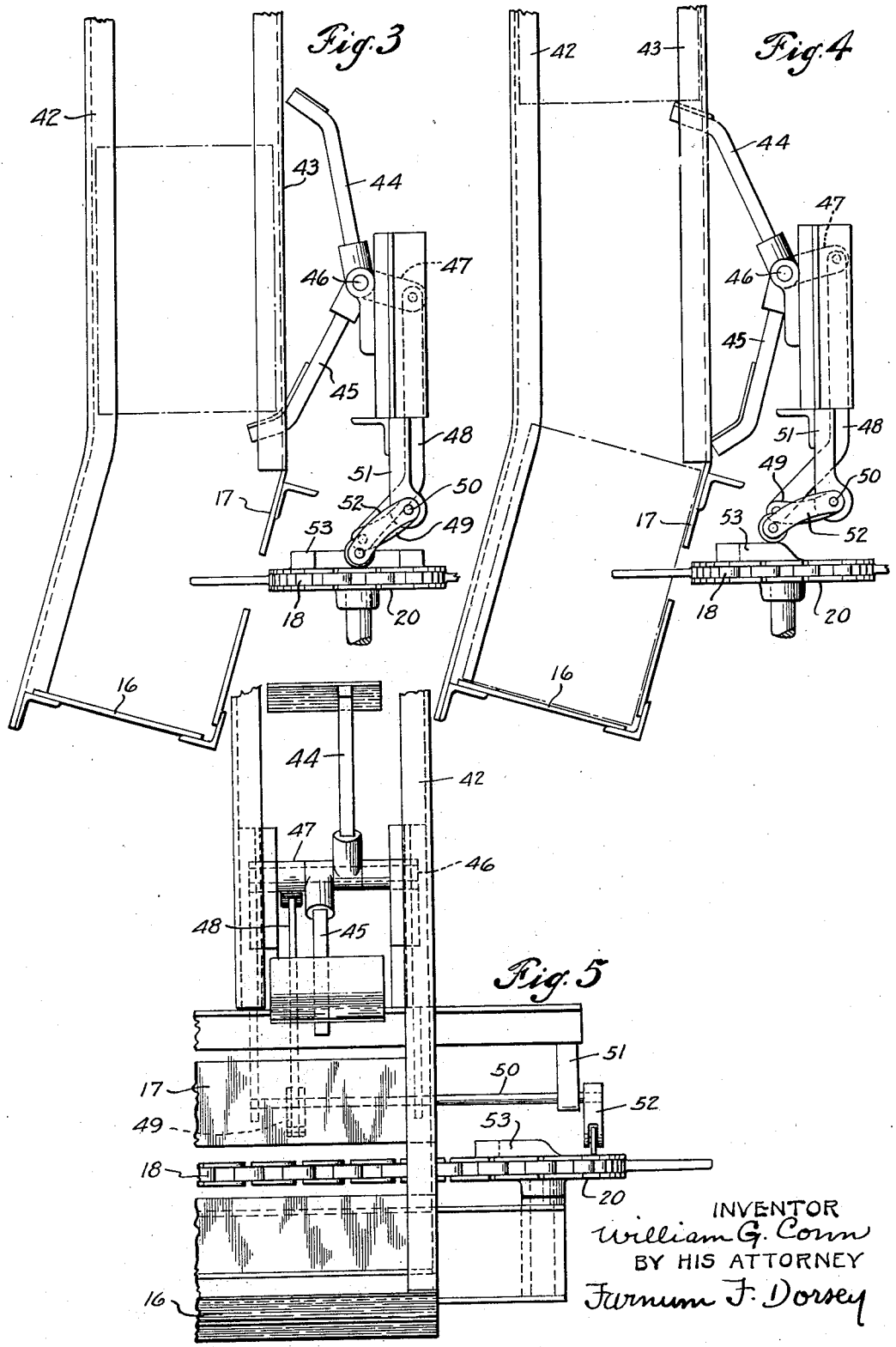

1,935,614

UNITED STATES PATENT OFFICE 1,935,614

FEED AND DISCHARGE MECHANISM

William G. Conn, Woodbury, N. J., assignor to Vacuum Oil Company, Inc., New York, N. Y., a corporation of New York Application August 17, 1931. Serial No. 557,523

4 Claims. (Cl. 113—115)

This invention relates to mechanism for controlling, automatically, the feed and discharge of articles which it is necessary to pass more than once through a machine for performing some operation upon the articles. In the manufacture of tin cans, for example, it is common to use a machine for soldering the end seams of the cans, and where the machine is designed to solder the seam at only one end at each passage of a can through the machine, it is necessary, after one such passage, to introduce the can again into the machine, in inverted position, so that the other end may be soldered.

The object of the present invention is to produce mechanism by the use of which a can, or other article which is to be operated upon, when once introduced into a machine, will automatically be carried twice through the machine and then discharged, and which will, when necessary, also invert the can or other article to cause opposite ends or portions to be acted upon.

To the foregoing end, the invention consists in feeding, conveying and ejecting mechanism operating automatically, in timed cooperation, to impart the described movements to the can or other article which is to be acted upon, and a preferred embodiment of such mechanism, as applied to a can-soldering machine, is illustrated in the accompanying drawings and hereinafter described.

Figure 1:
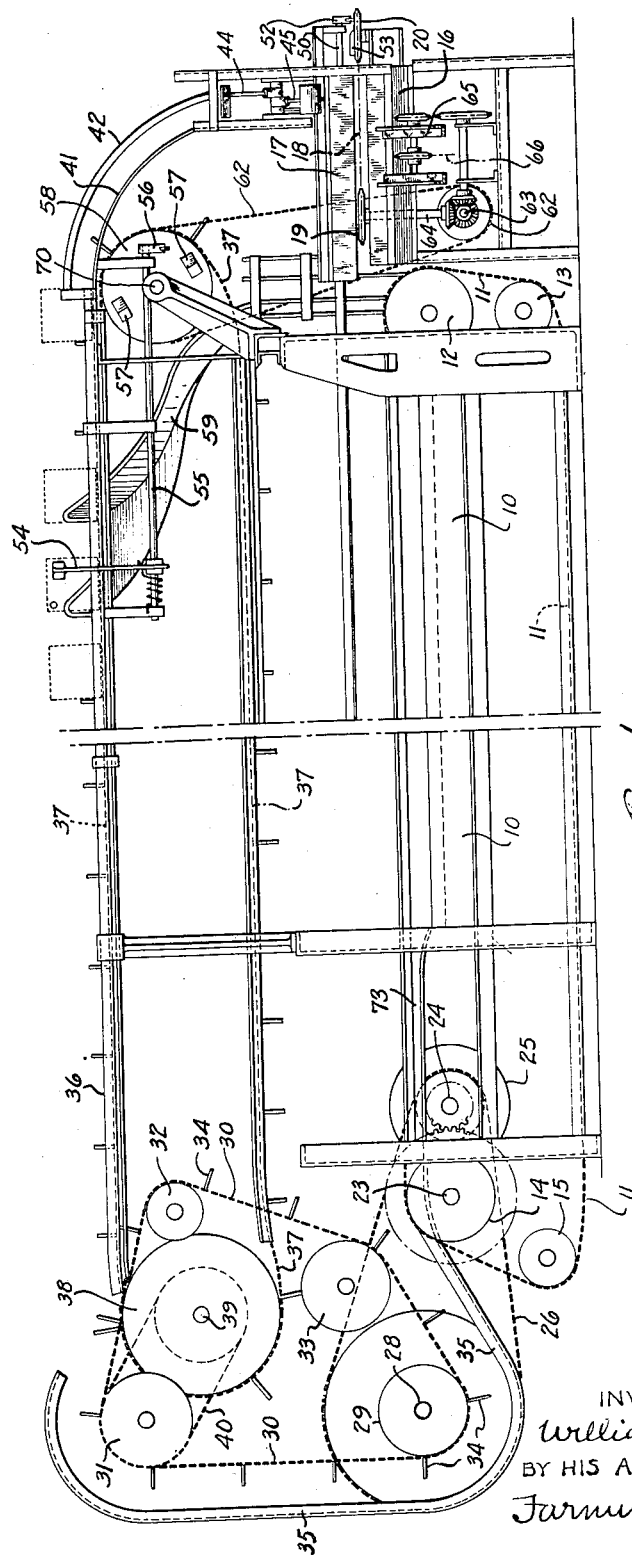
Figure 2:
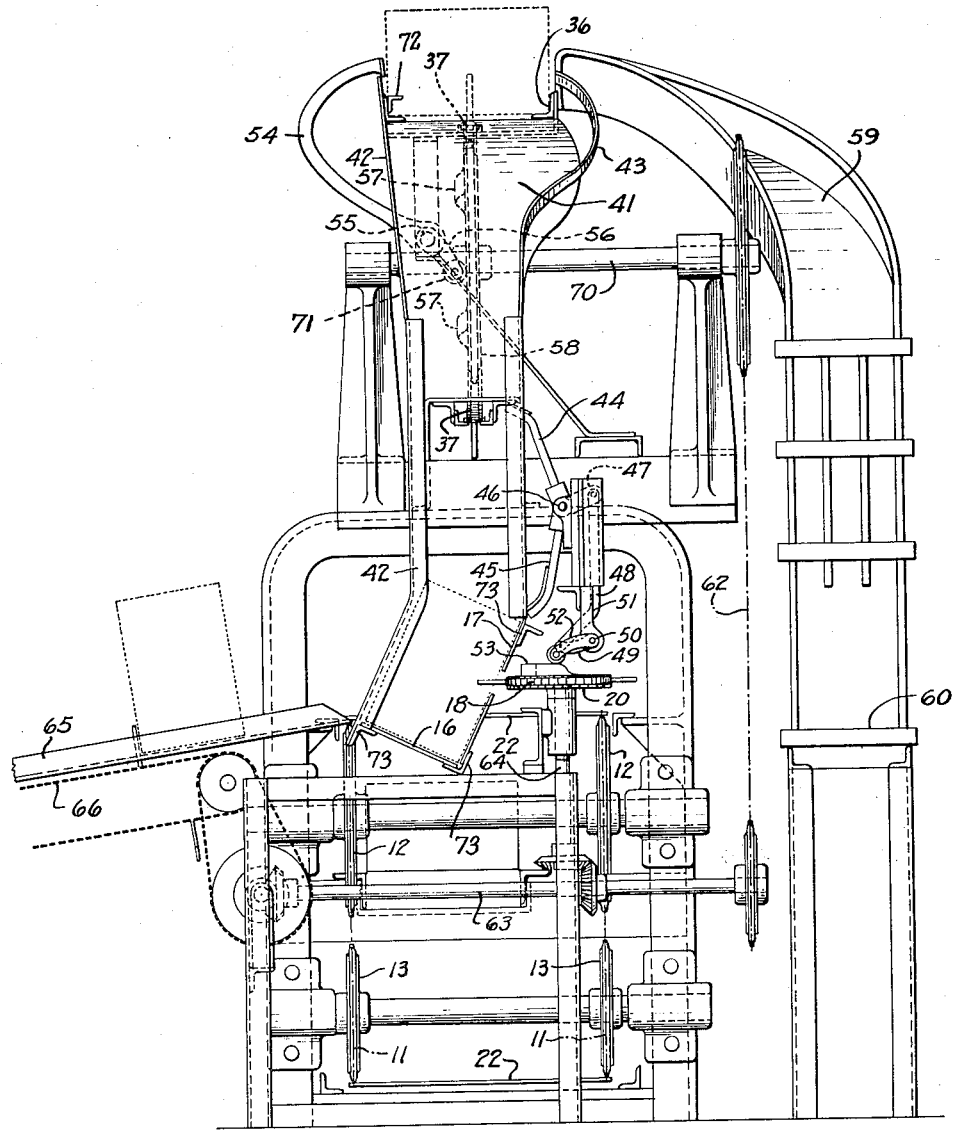

In the accompanying drawings, Fig. 1 is a side elevation, partly diagrammatic, showing a can soldering machine embodying the present invention, and Fig. 2 is an end elevation of the same on a larger scale, looking from right to left in Fig. 1. Figs. 3 and 4 are enlarged details from Fig. 2, showing particularly the escapement mechanism for controlling the feeding of the cans, and Fig. 5 is a front elevation of the same mechanism.

The invention is shown as embodied in a machine of a well-known type for soldering the seams at the ends of rectangular cans such as are used as containers for oil and other liquids, and since the details of construction and operation of such machines are well known, they are not set forth herein, except so far as it is necessary for an understanding of the present invention.

The soldering machine has the usual series of solder troughs 10, into which the end angles of the cans are dipped in the usual manner, in order to solder the end seams. For this purpose the cans are propelled along suitable guideways 73 by an endless conveyor comprising two endless chains 11. At the front or right-hand end of the machine these chains pass over upper and lower sprocket wheels 12 and 13, while at the opposite end of the machine they pass over upper and lower sprocket wheels 14 and 15. The wheels 14 are mounted on a shaft 23 which is geared, as shown in Fig. 1, to a shaft 24 which constitutes the drive-shaft of the machine and is provided, for that purpose, with a pulley 25 through which it may be connected with any suitable source of power.

Cross-bars 22 connecting the chains 11 engage the cans and propel them in timed sequence through the machine and into and out of operative relation with the soldering troughs. During this movement of the cans with relation to the soldering troughs, they are supported in the usual manner upon guide rails 73 in nearly upright position, as shown in Fig. 2. Near the rear end of the machine, the guide rails are so formed as to permit the cans to settle to a position in which their length is horizontal.

An elevating conveyor is arranged in cooperative relation with the main conveyor just described. This elevating conveyor comprises a chain 30, driven by a sprocket wheel 29 on a shaft 28. The shaft is connected with the power shaft 24 by sprocket wheels and a chain 26, so that the elevating conveyor operates in timed relation with the main conveyor. Guide rails 35 receive the cans from the main conveyor, and the fingers 34 on the elevating conveyor then slide them upwardly, in engagement with the guide rails, until they reach the upper stretch of the elevating conveyor. This stretch is positioned by guide wheels 31 and 32, and a third guide wheel 33 directs the conveyor in its lower portion. The cans are returned to the front end of the machine by a third or return conveyor, which consists of an endless chain 37 passing, at the rear of the machine, over a sprocket wheel 38 carried by a shaft 39. This shaft is connected, by gearing including a sprocket chain 40, with the guide wheel 31, so that the return conveyor is driven in timed relation with the other two conveyors. The fingers on the return conveyor slide the cans along guideways 36 extending along the top of the machine.

At the forward end of the return conveyor the cans are discharged upon a curved guideway 41 and between guide rails 42 and 43. At this point the cans are moving laterally, but the guide rail 43 is so formed that each can, in descending between the rails, may be turned into an upright position. This turning movement is caused by a stop-lug 72, shown in Fig. 2, which engages the left-hand end of the can and arrests this end so that the continued propulsion of the can by the conveyor causes the right-hand end of the can to swing forwardly and downwardly. Since the left-hand end is that which has already been soldered, it results that the unsoldered end is that which is turned downwardly on the guideway. Each can descending, by gravity, upon the guideway 41 is arrested by escapement mechanism comprising two arms 44 and 45, carried by a rock shaft 46. The rock shaft is provided with an arm 47 which is connected, by a bent link 48, with an arm 49 fixed on a rock shaft 50. This last rock shaft is journalled in a bearing 51 on the frame of the machine, and is provided with a second arm 52 carrying a cam roller, which cooperates with a cam 53 on the upper face of a sprocket wheel 20. This wheel is free to turn upon a vertical axis. The sprocket wheel 20 cooperates with a second sprocket wheel 19 in supporting a short endless conveyor chain 18. The fingers upon this chain move through a slot in an upright guide plate 17, which cooperates with a feed table 16 to support the cans which are about to be introduced into the machine. The sprocket wheel 19 is carried and driven by a vertical shaft 64 having gear connection, as shown in Fig. 1, with a horizontal shaft 63. The shaft 63 is connected, by a sprocket chain 62, with a shaft 70 near the front of the machine, and this shaft carries a sprocket wheel 58 by which the return conveyor 37 is supported at its forward end. By the connections just described the feed conveyor 18 is driven in timed relation with the other parts of the machine.

If a can be placed on the feed table 16 in upright position, it is carried by the feed conveyor, into engagement with the main conveyor, and is then fed automatically through the machine. Upon its emergence from the machine, it lies upon its side, with the end which has just been soldered directed toward the right side of the machine (as seen in Fig. 2). The can is returned in this position by the elevating conveyor and the return conveyor, and is thus delivered to the guideway 41, turned with the soldered end up, and arrested by the escapement mechanism as already described. By the suitably timed rocking action of the escapement mechanism, the can is first arrested by the upper arm 44, is then permitted to descend into engagement with the arm 45, and is finally released by the latter and permitted to descend to the feed table. At this time the can is in such position that the end which was in a lower position, during the first passage of the can through the machine, is now in the upper position, so that the other end, which has not yet been soldered, is in position to be acted on. The can is then introduced again into the machine automatically, by the action of the feed conveyor.

After the can has passed a second time through the machine it is necessary to eject it. For this purpose, mechanism is provided comprising an arm 54 located in position to engage a can on the return conveyor and expel it laterally from the conveyor. This arm is carried by a rock shaft 55 journalled on the frame of the machine, and a second arm 56, on the forward end of the rock shaft, carries a roller 71 which cooperates with cam projections 57 on the face of the sprocket wheel 58. These projections are so spaced, and the operation of the mechanism so timed, that the arm 54 is actuated to engage and expel a can at the moment when each alternate can on the return conveyor comes into position in line with the expeller arm. The can so expelled slides down a guideway 59 to a table 60, from which it may be removed either manually or by a suitable conveyor.

The escapement mechanism is so timed that it releases a can into cooperative relation with the feed conveyor 18 at each alternate position on the conveyor. The fresh cans, which have not been operated on, are introduced, either automatically or by hand, so as to be engaged by the intermediate fingers of the feed conveyor, and thus the cans engaged and propelled by the main conveyor are alternately those which have not yet been soldered and those which have been soldered at one end only. The expelling mechanism is so positioned that the alternate cans engaged by it are those which have passed twice through the machine and thus been soldered on both ends.

The fresh cans may be placed on the feed table by hand, but in the drawings the machine is shown as provided with means in the form of a conveyor for this purpose. This conveyor comprises a chain 66 which moves the cans along inclined guideways 65. By means of gearing which is clearly shown in the drawings and need not be described in detail, the conveyer 66 is operated in timed relation with the feed conveyor, so that a series of cans is brought to the latter and introduced at the proper time.

Although the invention has been described as applied to a machine for soldering the end seams of cans, it will be evident that it is applicable, by suitable modifications within the ordinary skill of the machine designer, to any machine in which it is necessary that the object acted upon be passed twice through the machine and then discharged.

The invention claimed is:

1. In a machine for soldering the end seams of cans, means for propelling a series of cans through the machine in position for one end of each can to be soldered, invariably operating means for returning each can, after its first passage through the machine, to the propelling means in inverted position, for a second passage through the machine, and means for expelling each can from the machine after its said second passage.

2. In a machine for soldering the end seams of cans, propelling means, for moving a series of cans through the machine in position for one end of each can to be soldered, the propelling means having a series of definite stations for the cans, means for introducing a series of cans to alternate stations only in said propelling means, means for transferring each of said series of cans, after its first passage through the machine, from its said alternate station to one of the intermediate stations only in the propelling means for a second passage through the machine, and means for expelling each can from the machine after its said second passage.

3. In a machine for soldering the end seams of cans, mechanism for conveying cans in a definitely ordered series through a continuous closed path for cooperation with the soldering instrumentalities, said mechanism comprising means for ejecting invariably each alternate can from the series as it passes a certain point in said path, and means for inverting the cans not so ejected and returning them invariably to alternate positions in said series.

4. In a machine for soldering the end seams of cans, the combination, with soldering instrumentalities, of a lower mechanical conveyor for feeding a series of cans past said instrumentalities from the forward end to the rear end of the machine, an upper mechanical conveyor for returning cans in said series to the forward end of the machine, means, including a guideway, into which cans are discharged by the upper conveyor and in which they descend by gravity, for returning cans to the lower conveyor in inverted position, and invariably operating means for ejecting each alternate can from said series after two passages past the soldering instrumentalities.

WILLIAM G. CONN.